(12) United States Patent
Ding et al.

(10) Patent No.: US 10,001,867 B2
(45) Date of Patent: Jun. 19, 2018

(54) TOUCH DISPLAY PANEL AND METHOD FOR CONTROLLING THE SAME, AND TOUCH DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaoliang Ding, Beijing (CN); Xue Dong, Beijing (CN); Haisheng Wang, Beijing (CN); Yingming Liu, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

( * ) Notice: Subject to any disclaimer, the term of this patent is extended or adjusted under 35 U.S.C. 154(b) by 214 days.

(21) Appl. No.: 14/771,698

(22) PCT Filed: Oct. 29, 2014

(86) PCT No.: PCT/CN2014/089764
§ 371 (c)(1),
(2) Date: Aug. 31, 2015

(87) PCT Pub. No.: WO2016/015394
PCT Pub. Date: Feb. 4, 2016

(65) Prior Publication Data
US 2016/0364065 A1    Dec. 15, 2016

(30) Foreign Application Priority Data

Jul. 28, 2014    (CN) .......................... 2014 1 0363982

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04104* (2013.01); *G06F 2203/04107* (2013.01)

(58) Field of Classification Search
None
See application file for complete search history.

(56) References Cited

U.S. PATENT DOCUMENTS

2014/0028616 A1* 1/2014 Furutani ................. G06F 3/044
                                                         345/174
2014/0049704 A1* 2/2014 Yao ..................... G02F 1/13338
                                                          349/12

(Continued)

FOREIGN PATENT DOCUMENTS

CN         103294294 A       9/2013
CN         103376966 A      10/2013

(Continued)

OTHER PUBLICATIONS

First Office Action regarding Chinese application No. 201410363982.0, dated Aug. 3, 2016. Translation provided by Dragon Intellectual Property Law Firm.

(Continued)

*Primary Examiner* — Grant Sitta
*Assistant Examiner* — Amen Bogale
(74) *Attorney, Agent, or Firm* — Harness, Dickey & Pierce, P.L.C.

(57) ABSTRACT

A touch display panel and a method for controlling the same and a touch display device are provided. The touch display panel includes at least one first electrode arranged in a same (Continued)

layer with the touch sensing electrode and insulated from the touch sensing electrode. The first electrode is electrically connected to a first signal input terminal in a display phase to discharge electrostatic charges in the first electrode, and is electrically connected to a second signal input terminal in a touch display phase to keep the first electrode in a high impedance state in the touch phase.

13 Claims, 5 Drawing Sheets

(56) References Cited

U.S. PATENT DOCUMENTS

| | | | |
|---|---|---|---|
| 2014/0176490 A1 | 6/2014 | Zhou et al. | |
| 2014/0247402 A1* | 9/2014 | Chou | G02F 1/13338 349/12 |
| 2014/0285466 A1* | 9/2014 | Hayashi | G06F 3/044 345/174 |
| 2015/0062457 A1* | 3/2015 | Kida | G06F 3/044 349/12 |
| 2015/0185902 A1* | 7/2015 | Liu | G06F 3/044 345/174 |

FOREIGN PATENT DOCUMENTS

| | | |
|---|---|---|
| CN | 103793120 A | 5/2014 |
| CN | 103885660 A | 6/2014 |

OTHER PUBLICATIONS

Written Opinion of the International Searching Authority for international application No. PCT/CN2014/089764.

\* cited by examiner

TOUCH DISPLAY PANEL AND METHOD FOR CONTROLLING THE SAME, AND TOUCH DISPLAY DEVICE

CROSS REFERENCE TO RELATED APPLICATION

This application is the U.S. national phase of PCT Application No. PCT/CN2014/089764 filed on Oct. 29, 2014, which claims the priority to Chinese Patent Application No. 201410363982.0, filed with the Chinese State Intellectual Property Office on Jul. 28, 2014, which is incorporated by reference in its entirety herein.

TECHNICAL FIELD

The present invention relates to the field of a display technique, and in particular to a touch display panel and a method for controlling the same and a touch display device.

BACKGROUND

As an input medium, a touch screen provides a better convenience than a keyboard and a mouse. Based on different implementing principles, the touch screen may be classified as a resistance type, a capacitance type, a surface acoustic wave type, an infrared type or the like. Currently, the resistive and capacitive touch screen technique is the most widely used.

Specifically, the capacitive touch screen may include a surface capacitive touch screen, a project self-capacitive touch screen, a project mutual-capacitive touch screen, a single-layer capacitive touch screen and the like. The project mutual-capacitive touch screen is becoming more and more popular due to its advantages such as a high sensitivity and a multi-point touch. A basic principle of the project mutual-capacitive touch screen is as follows. A voltage is added on a driving line, and a signal variation is detected on a detecting line. X-direction coordinates are determined by the driving line, and Y-direction coordinates are determined by the detecting line. In detection, X-direction driving lines are progressively scanned, and in scanning each line of driving lines, a signal on each of the detecting lines is read. Thereby, after one period of scan, an intersection between any one of the lines and any one of the columns may be scanned, and X*Y signals are scanned in total. With this detection method, coordinates of multiple points may be determined, and thus the multi-point touch may be achieved.

As an electronic display product, the project mutual-capacitive touch screen encounters the electrostatic problem, as with other electronic products. In the conventional project mutual-capacitive touch screen, a whole layer of high-resistive membrane material is provided as an electrostatic discharge shielding layer, so as to discharge the electrostatic charges.

However, the high-resistive membrane material has tens of millimeters of delays in the electrostatic discharge due to its high resistance (such as 50M to 100M), thereby the electrostatic charges are not discharged timely and splash screen phenomenon occurs on the project mutual-capacitive touch screen.

SUMMARY

The disclosure provides a touch display panel and a method for controlling the same and a touch display device, for quickly discharging the electrostatic charges inside the touch display device without affecting the touch detection, and ensuring the display quality of the touch display device.

The disclosure provides solutions as follows.

An embodiment of the present disclosure provides a touch display panel, including multiple touch sensing electrodes, where the touch display panel further includes:

at least one first electrode arranged in a same layer with the touch sensing electrode and insulated from the touch sensing electrode, where the first electrode is electrically connected to a first signal input terminal in a display phase to discharge electrostatic charges in the first electrode, and is electrically connected to a second signal input terminal in a touch phase to keep the first electrode in a high impedance state in the touch phase.

Optionally, a pattern of the first electrode is of a grid shape or plate shape.

Optionally, the first electrode includes multiple strips electrically connected to each other at at least one end of each of the stripes.

Optionally, a pattern of the first electrode includes multiple stripe patterns arranged in parallel with the touch sensing electrode, or multiple stripe patterns arranged to cross the touch sensing electrode perpendicularly.

Optionally, the first electrode is electrically connected to multiple first signal input terminals.

Optionally, the first signal input terminal is electrically connected to a corner of the first electrode.

Optionally, the touch display panel further includes:

a black matrix arranged on a glass substrate, where the first electrode and the touch sensing electrode are arranged on the black matrix, and projections of the first electrode and the touch sensing electrode onto the glass substrate are within a projection of the black matrix onto the glass substrate.

Optionally, the number of the at least one first electrode is more than one, and the plurality of first electrodes and the plurality of touch sensing electrodes are arranged alternately and extend in a same direction.

Optionally, the touch display panel further includes:

an insulating layer arranged on the first electrode and the touch sensing electrode; and a bridging layer arranged on the insulating layer, where the bridging layer is configured to implement an electric connection between the plurality of first electrodes.

Optionally, a pattern of the insulating layer and the bridging layer is arranged within a coverage of the black matrix.

Optionally, the insulating layer is formed at a position where projections of the bridging layer and the touch sensing electrode onto the glass substrate overlap, and an area of a projection of the insulating layer onto the glass substrate is greater than an area of a projection of the bridging layer onto the touch sensing electrode.

Optionally, a pattern of the bridging layer is at a preset position within and/or outside a display region of the touch display panel.

Optionally, an electric potential of a first signal is lower than an electric potential of the electrostatic charges in the first electrode.

Optionally, the first signal is a common electrode signal.

Optionally, the second signal input terminal is a floating terminal.

Optionally, the first electrode is made of a metal conducting material.

Optionally, the touch display panel is a color filter substrate, and the color filter substrate comprises a bridging layer and a color filter layer arranged on the bridging layer An embodiment according to the disclosure further provides a method for controlling the touch display panel provided by the embodiment according to the disclosure described above, which includes:

in a display phase, enabling the first electrode to be electrically connected to the first signal input terminal to discharge the electrostatic charges in the first electrode; and in a touch phase, enabling the first electrode to be electrically connected to the second signal input terminal to keep the first electrode in a high impedance state in the touch phase.

An embodiment according to the disclosure further provides a touch display device including the touch display panel provided by the embodiment according to the disclosure described above.

Optionally, the touch display device further includes:

a second touch display panel including touch driving electrodes and common electrodes alternately arranged in a same layer and insulated from each other, where the touch driving electrodes are arranged in a different layer from the touch sensing electrode and cross the touch sensing electrodes.

As can be seen, with the touch display panel and the method for controlling the same and the touch display device provided by the embodiments according to the disclosure, at least one first electrode is arranged in the touch display panel and is arranged in a same layer with the touch sensing electrode and insulated from the touch sensing electrode. The charge conduction rate of the first electrode is greater than a first preset threshold. The first electrode is electrically connected to a first signal input terminal in a display phase to discharge electrostatic charges in the first electrode, and is electrically connected to a second signal input terminal in a touch phase to keep the first electrode in a high impedance state in the touch phase. Thus, the electrostatic charges inside the touch display device are discharged quickly without affecting the touch detection, and the display quality of the touch display device is ensured.

DETAILED DESCRIPTION

To illustrate the objects, technical solutions and advantages of the present disclosure more clearly, the technical solutions in the embodiments of the present disclosure will be described clearly and completely hereinafter in conjunction with the drawings in the embodiments of the present disclosure. Apparently, the described embodiments are only some but not all of the embodiments of the present disclosure. All the other embodiments obtained by those ordinary skilled in the art based on the embodiments of the present disclosure without creative effort fall within the scope of protection of the present disclosure.

Technical terms or scientific terms used herein should be interpreted to have the common meanings as understood by those skilled in the art, unless defined otherwise. Words such as "first" and "second" used in the specification and the claims of the disclosed patent application do not indicate any order, quantity or importance, but only to distinguish different components. Likewise, words such as "one" and "a" do not indicate any quantity limitation, but only represent presence of at least one. Words such as "connection" and "connected" are not limited to physical or mechanical connection, but may include electrical connection, direct or indirect. Words such as "above", "below", "left" and "right" are only used to indicate relative position relations, and the relative position relation changes as an absolute position of a description object changes.

Figure 1:
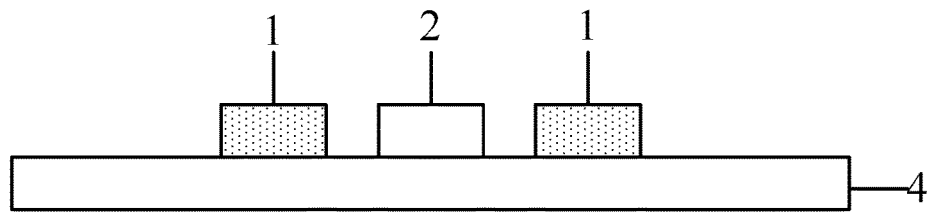
FIG. 1 is a schematic diagram showing a structure of a touch display panel according to an embodiment of the disclosure.
Figure 2:
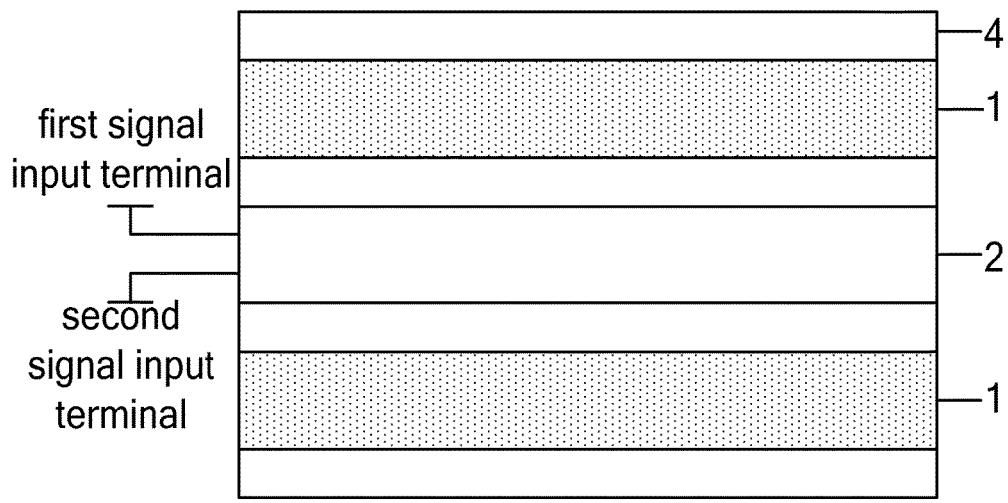
FIG. 2 is a schematic diagram showing a structure of a touch display panel according to another embodiment of the disclosure.

An embodiment of the present disclosure provides a touch display panel, as shown in FIG. 1 and FIG. 2, and the touch display panel may include multiple touch sensing electrodes (RX) 1.

The touch display panel may further include:

at least one first electrode 2 arranged in a same layer with the touch sensing electrode 1 and insulated from the touch sensing electrode, where the first electrode 2 is electrically connected to a first signal input terminal in a display phase to discharge electrostatic charges in the first electrode 2, and is electrically connected to a second signal input terminal in a touch phase to keep the first electrode 2 in a high impedance state in the touch phase.

In the touch display panel provided in an embodiment of the disclosure, the first electrode 2 arranged in the same layer with the touch sensing electrode 1 is used as the electrostatic discharge shielding layer. In the display phase, the first electrode 2 is electrically connected to the first signal input terminal with an electric potential lower than the electric potential of the electrostatic charges. Since the transmission rate of the charges of the first electrode 2 may be greater than a first preset threshold, the electrostatic charges may be discharged quickly. In the touch phase, the first electrode 2 is electrically connected to the second signal input terminal, so that the first electrode 2 is in the high impedance state Hi-Z, that is, the electrostatic discharge of the first electrode 2 is stopped to prevent the touch detection from being affected by the electrostatic discharge. Thus, the electrostatic charges inside the touch display device are discharged quickly without affecting the touch detection, and the display quality of the touch display device is ensured.

The first preset threshold mentioned in an embodiment of the disclosure may be set based on parameters such as physical characteristics of the material of the first electrode 2. It is to be noted that the first electrode 2 mentioned in an embodiment of the disclosure is a good electric conductor. For example, the first electrode 2 mentioned in an embodiment of the disclosure may be made of metal conductive material. Since the charge transmission rate of the materials such as metal approaches to the light speed, the electrostatic discharge speed of the first electrode 2 mentioned in an embodiment of the disclosure is greater than that of the high impedance membrane material significantly. With this, in an embodiment of the disclosure, since the electrostatic discharge speed of the first electrode 2 made of the conductive material such as metal is high and the time occupied by the touch phase in a period of time is relatively less (such as 200 us or less), the first electrode 2 mentioned in an embodiment of the disclosure still achieves the quick electrostatic discharge, thereby reducing or even eliminating the effect of the electrostatic charges on the touch display device, even if the first electrode 2 is in the high impedance state in the touch phase, that is, there is no electrostatic discharge.

Since the electric potential of the electrostatic charges is relatively high (several tens of thousands volts), the first signal mentioned in an embodiment of the disclosure may be any existing signal in the touch display device, such as a common electrode (Vcom) signal of a fraction of one volt or negative one volt. In the display phase, when the first electrode 2 is electrically connected to the first signal input terminal, the electrostatic charges inside the first electrode 2 will be transferred to the first signal input terminal quickly due to the characteristics of charge transfer from high electric potential to low electric potential, so that the electric potential of the first electrode 2 is equal to the electric potential of the first signal, and the rapid discharge of the electrostatic charges is achieved.

In the touch phase, the first electrode 2 is electrically connected to the second signal input terminal. Since the second signal input terminal may be a floating terminal, the first electrode 2 may be in the high impedance state Hi-Z in the control phase, thereby stopping the discharge of the electrostatic charges.

Figure 3:
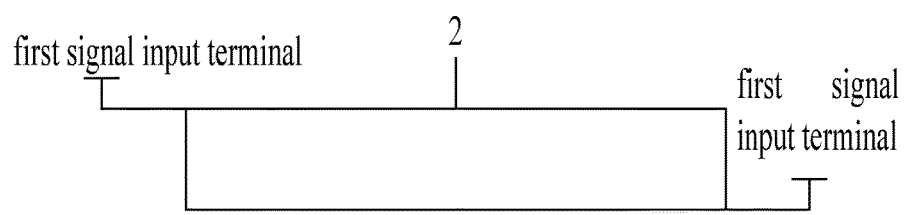
FIG. 3 is a schematic diagram showing a connection between a first electrode and a first signal input terminal according to an embodiment of the disclosure.

Further, the first electrode 2 may be electrically connected to multiple first signal input terminals, i.e., multiple electrostatic discharge channels are added, so as to increase the electrostatic discharge speed, as shown in FIG. 3. In an embodiment of the disclosure, the first signal input terminal may be electrically connected to a corner of the first electrode 2, so that the electrostatic charges inside the first electrode 2, especially at the corner of the first electrode 2, are discharged completely.

In an embodiment of the disclosure, as shown in FIG. 1 and FIG. 2, the pattern of the first electrode 2 may be a whole piece of metal. That is, the pattern of the first electrode 2 may have a plate-shape.

Figure 4:
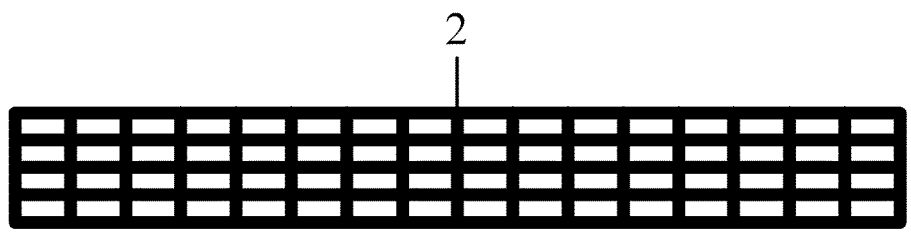
FIG. 4 is a schematic diagram showing a pattern of a first electrode according to an embodiment of the disclosure.

In another embodiment of the disclosure, as shown in FIG. 4, the pattern of the first electrode 2 may also be a grid-shaped pattern, i.e. a pattern of the first electrode 2 including multiple metal stripes arranged to intersect with each other, thereby reducing the use of the metal material and decreasing the weight and the cost of the touch display panel.

Figure 5:
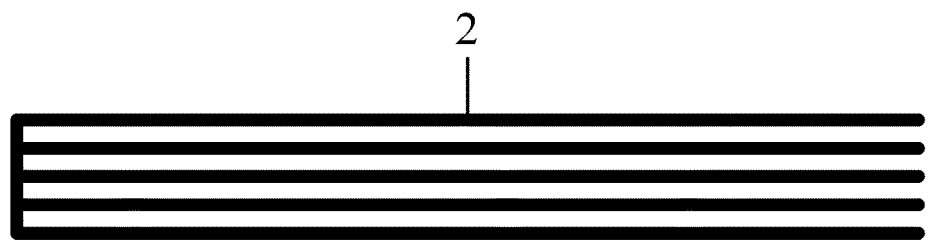
FIG. 5 is a schematic diagram showing a pattern of a first electrode according to another embodiment of the disclosure.
Figure 6:
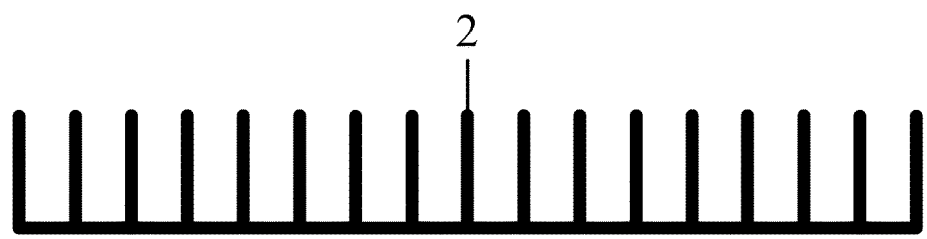
FIG. 6 is a schematic diagram showing a pattern of a first electrode according to another embodiment of the disclosure.

In another embodiment of the disclosure, the first electrode 2 may include multiple metal horizontal stripes arranged in parallel with the touch sensing electrode 1 (as shown in FIG. 5), or multiple metal vertical stripes arranged to intersect with the touch sensing electrode perpendicularly (as shown in FIG. 6). That is, the first electrode 2 may include multiple stripe patterns, and at least one end of each of the plurality of stripes are electrically connected for example via a metal wire.

The pattern of the first electrode 2 as shown in FIG. 5 and FIG. 6 may also reduce the use of the metal material and decrease the weight and the cost of the touch display panel.

In a case that the first electrode 2 mentioned in an embodiment of the disclosure includes the metal stripes as shown in FIG. 5 and FIG. 6, these metal stripes may be arranged within a projection of a black matrix 3. That is, the metal stripes arranged in the horizontal direction (in parallel with the touch driving electrode) are arranged in the array substrate in positions where gate lines are arranged, and the metal stripes arranged in the vertical direction (intersect with the touch driving electrode perpendicularly) are arranged in the array substrate in positions where data lines are arranged, thereby preventing the pattern of the first electrode 2 from affecting the display by covering the pattern of the first electrode 2 with the black matrix 3.

That is, in an embodiment of the disclosure, the first electrode 2 may be covered by the black matrix 3.

Figure 7:
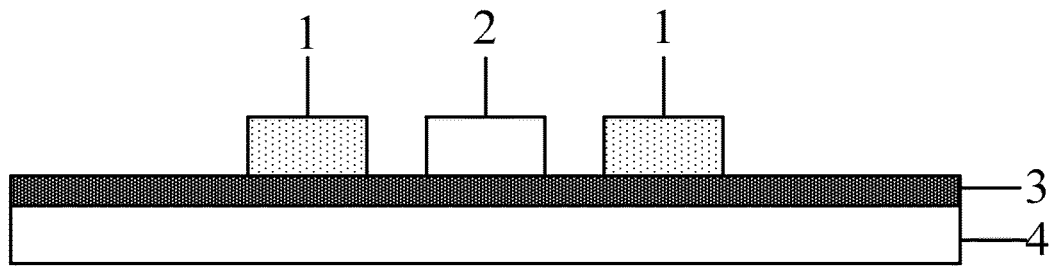
FIG. 7 is a schematic diagram showing a structure of a touch display panel provided in another embodiment according to the disclosure.

As shown in FIG. 7, the touch display panel provided in an embodiment of the disclosure may further include:

a black matrix 3 arranged on a glass substrate 4, where the first electrode 2 and the touch sensing electrode 1 are arranged on the black matrix 3, and projections of the first electrode 2 and the touch sensing electrode 1 onto the touch display panel are overlapped by a projection of the black matrix 3 onto the touch display panel.

Figure 8:
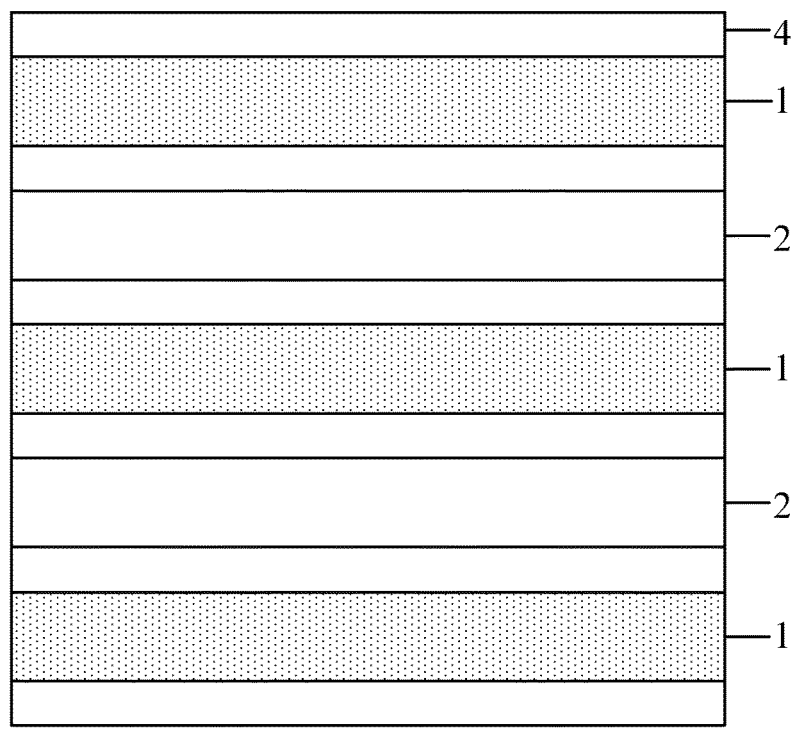
FIG. 8 is a schematic diagram showing a structure of a touch display panel according to still another embodiment of the disclosure.

In an embodiment of the disclosure, as shown in FIG. 8, the touch display panel may include multiple first electrodes 2, and the multiple first electrodes 2 may be arranged in the electrode layer in a region that is not covered by the touch driving electrode 1.

As shown in FIG. 8, the multiple first electrodes 2 and the multiple touch sensing electrodes 1 in parallel may be arranged alternately and extend in a same direction.

With the multiple first electrodes 2, the area of the coverage of the electrostatic discharge shielding layer may be enlarged, for achieving a better shielding effect. Since the multiple first electrodes 2 may be electrically connected with multiple first signal input terminals respectively, the electrostatic discharge speed may be further increased.

Figure 9:
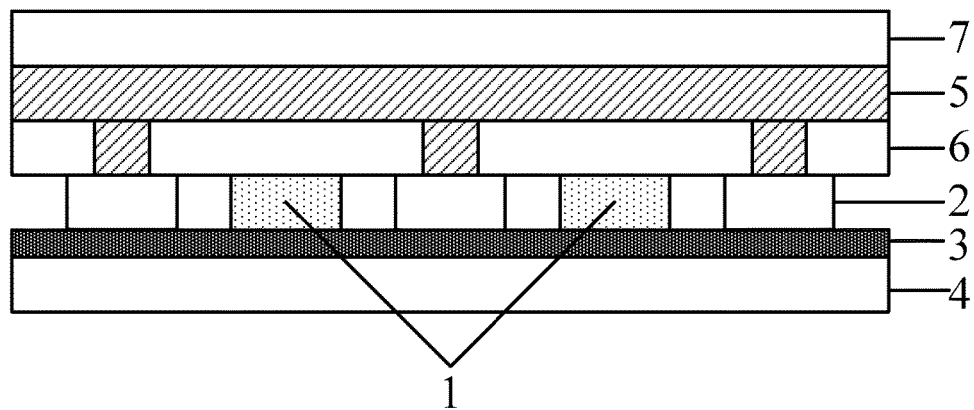
FIG. 9 is a schematic diagram showing a structure of a touch display panel according to yet another embodiment of the disclosure.

As shown in FIG. 8, the touch sensing electrode 1 are arranged between the first electrodes 2, and thus the multiple first electrode 2 are separate from each other. As shown in FIG. 9, in an embodiment of the disclosure, a bridging layer 5 may be provided to electrically connect the multiple first electrodes 2 separate from each other, thereby keeping consistence in the electric potentials of the multiple first electrodes 2 both in the electrostatic discharge state and the non-electrostatic discharge state.

In an embodiment of the disclosure, the multiple separate first electrodes 2 may be electrically connected via a bridging or wire jumping manner as a whole electrostatic discharge shielding layer.

Further, to preventing the first electrode 2 from being electrically connected to the metal conductive pattern layer, such as the touch sensing electrode 1, as shown in FIG. 9, an insulating layer 6 may be arranged above the electrode layer, and a bridging layer 5 may be formed on the insulating layer 6, for achieving the electrical connection among the multiple first electrodes 2.

The touch display panel provided in an embodiment of the disclosure may further include:

an insulating layer 6 arranged on the electrode layer; and a bridging layer 5 arranged on the insulating layer 6, where the bridging layer 5 is configured to implement an electric connection among the multiple first electrodes 2.

With the bridging layer 5, the electric connection among the multiple first electrodes 2 are achieved, and in the case that only one first signal input terminal is provided, the electrostatic discharge of the multiple first electrodes 2 is achieved. That is, with the bridging layer 5, the electrostatic discharge of the multiple first electrodes 2 within the electrostatic discharge shielding layer is achieved, no matter which one of the multiple first electrodes 2 is electrically connected to the first signal input terminal.

The insulating layer 6 and the bridging layer 5 provided in an embodiment of the disclosure may be implemented by arranging a whole layer of corresponding material, and may be implemented by arranging a pattern of the insulating layer 6 and the bridging layer 5 within the coverage area of the black matrix 3, that is, the insulating layer 6 and the bridging layer 5 each may have a stripe-shape, thereby preventing the pattern of the insulating layer 6 and the bridging layer 5 from affecting the normal display by covering the pattern of the insulating layer 6 and the bridging layer 5 with the black matrix 3.

Figure 10:
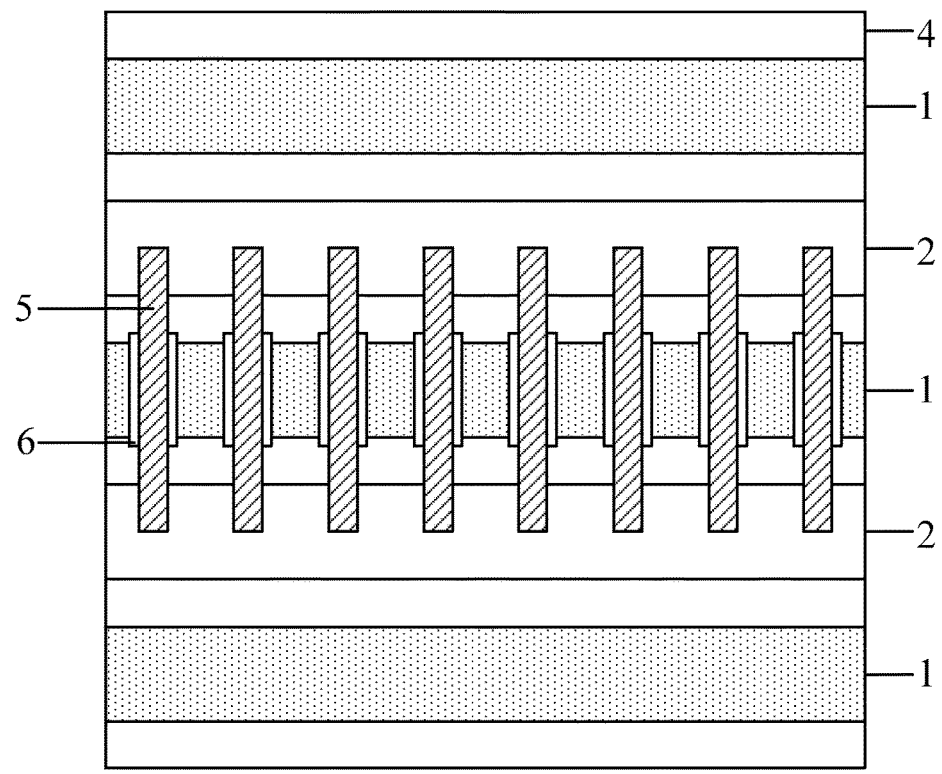
FIG. 10 is a schematic diagram showing a structure of a touch display panel according to yet another embodiment of the disclosure.

Further, as shown in FIG. 10, the insulating layer 6 may be arranged in a region in which a projection of the bridging layer 5 overlaps with a projection of the touch sensing electrode 1, thereby saving the material of the insulating layer 6.

Moreover, to preventing the bridging layer 5 from being electrically connected to the conductive pattern layer, such as the touch sensing electrode 1, the area of the coverage of the stripe pattern of the insulating layer 6 should be greater than the area of the projection of the stripe pattern of the corresponding bridging layer 5 onto the touch sensing electrode 1.

Further, to preventing the pattern of the bridging layer 5 from affecting the display, the pattern of the bridging layer 5 may be arranged at a preset position on the touch display panel outside the display region, thereby fundamentally avoiding the effect of the bridging layer 5 on the display.

The touch display panel provided in an embodiment of the disclosure may be a color film substrate.

In this case, as shown in FIG. 9, the color film substrate may further include a color film layer 7, that is, a color filtering layer corresponding to the original color. The color film layer 7 may be arranged above the bridging layer.

Figure 11:
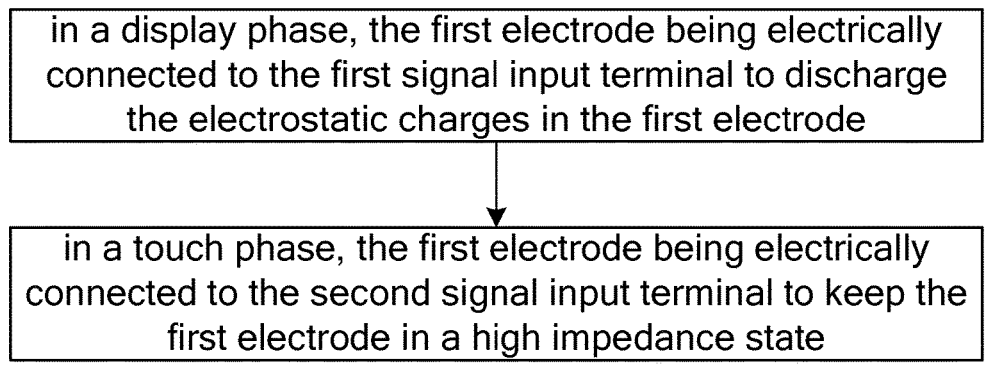
FIG. 11 is a schematic flow chart of a method for controlling a touch display panel according to an embodiment of the disclosure.

An embodiment of the disclosure further provides a method for controlling an touch display panel, as shown in FIG. 11, which includes:

in a display phase, electrically connecting the first electrode 2 to the first signal input terminal to discharge the electrostatic charges in the first electrode; and in a touch phase, electrically connecting the first electrode 2 to the second signal input terminal to keep the first electrode 2 in a high impedance state.

Based on the touch display panel provided in an embodiment of the disclosure, an embodiment of the disclosure may further provide a touch display device including the touch display panel provided in the embodiment of the disclosure.

The touch display device may further include:

a second touch display panel including touch driving electrodes and common electrodes arranged alternately in a same layer and insulated from each other, where the touch driving electrodes and the touch sensing electrodes are arranged in a different layer and crossed to each other. For example, the touch driving electrodes and the touch sensing electrodes 1 are crossed to each other perpendicularly.

With the touch display panel and the method for controlling the same and the touch display device provided by the embodiments according to the disclosure, at least one first electrode is arranged in the touch display panel and is arranged in a same layer with the touch sensing electrode and insulated from the touch sensing electrode. The first electrode is electrically connected to a first signal input terminal in a display phase to discharge electrostatic charges in the first electrode, and is electrically connected to a second signal input terminal in a touch phase to keep the first electrode in a high impedance state in the touch phase. Thus, the electrostatic charges inside the touch display device are discharged quickly without affecting the touch detection, and the display quality of the touch display device is ensured.

The above are only embodiments of the disclosure. It is to be noted that, several modifications and improvements may be made by those skilled in the art without deviating from the principle of the disclosure, and these modifications and improvements shall also be considered as the scope of protection of the present disclosure.

What is claimed is:

1. A touch display device, comprising a first layer and a second layer, wherein the first layer comprises:
    a plurality of touch sensing electrodes;
    a plurality of first electrodes arranged in a same layer with the plurality of touch sensing electrodes and insulated from the plurality of touch sensing electrodes;
    an insulating layer arranged on at least one first electrode of the plurality of first electrodes and at least one touch sensing electrode of the plurality of touch sensing electrodes; and
    a bridging layer arranged on the insulation layer, wherein the bridging layer is configured to implement an electric connection between at least three electrodes of the plurality of first electrodes,
    wherein the at least one first electrode is electrically connected to a first signal input terminal in a display phase to discharge electrostatic charges in the at least one first electrode and is electrically connected to a second signal input terminal in a touch phase to maintain the at least one first electrode in a high impedance state in the touch phase,
    wherein the second layer comprises touch driving electrodes and common electrodes alternately arranged in a same layer and insulated from each other, the touch driving electrodes arranged in a different layer from the plurality of touch sensing electrodes and cross the plurality of touch sensing electrodes,
    wherein a pattern of the at least one first electrode comprises a grid shape, and the plurality of first electrodes and the plurality of touch sensing electrodes are arranged alternately and extend in a same direction.

2. The touch display device according to claim 1, wherein the at least one first electrode is electrically connected to a plurality of first signal input terminals.

3. The touch display device according to claim 1, wherein the first signal input terminal is electrically connected to a corner of the at least one first electrode.

4. The touch display device according to claim 1, further comprising:
 a black matrix arranged on a glass substrate, wherein
 the at least one first electrode and at least one touch sensing electrode of the plurality of touch sensing electrodes are arranged on the black matrix, and
 projections of the at least one first electrode and the at least one touch sensing electrode onto the glass substrate are within a projection of the black matrix onto the glass substrate.

5. The touch display device according to claim 1, wherein a pattern of the insulating layer and the bridging layer is arranged within a coverage of a black matrix.

6. The touch display device according to claim 1, wherein the insulating layer is formed at a position where projections of the bridging layer and the at least one touch sensing electrode onto a glass substrate overlap, and an area of a projection of the insulating layer onto the glass substrate is greater than an area of a projection of the bridging layer onto the at least one touch sensing electrode.

7. The touch display device according to claim 1, wherein a pattern of the bridging layer is at a preset position within and/or outside a display region of the first layer.

8. The touch display device according to claim 1, wherein an electric potential of a first signal is lower than an electric potential of the electrostatic charges in the at least one first electrode.

9. The touch display device according to claim 1, wherein a first signal from the first signal input terminal is a common electrode signal.

10. The touch display device according to claim 1, wherein the second signal input terminal is a floating terminal.

11. The touch display device according to claim 1, wherein the at least one first electrode is made of a metal conducting material.

12. The touch display device according to claim 1, wherein the first layer is a color filter substrate, and the color filter substrate comprises a bridging layer and a color filter layer arranged on the bridging layer.

13. A method for controlling the touch display device according to claim 1, comprising:
 in a display phase, enabling the at least one first electrode to be electrically connected to the first signal input terminal to discharge the electrostatic charges in the at least one first electrode; and
 in a touch phase, enabling the at least one first electrode to be electrically connected to the second signal input terminal to maintain the at least one first electrode in a high impedance state in the touch phase.

* * * * *